United States Patent
Kim

(10) Patent No.: US 10,914,816 B2
(45) Date of Patent: Feb. 9, 2021

(54) METHOD AND APPARATUS FOR DETECTING OBJECT USING RADAR OF VEHICLE

(71) Applicant: Samsung Electronics Co., Ltd., Suwon-si (KR)

(72) Inventor: DongHan Kim, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 269 days.

(21) Appl. No.: 15/935,201

(22) Filed: Mar. 26, 2018

(65) Prior Publication Data

US 2019/0154793 A1 May 23, 2019

(30) Foreign Application Priority Data

Nov. 17, 2017 (KR) .................. 10-2017-0154249

(51) Int. Cl.
*G01S 7/02* (2006.01)
*G01S 13/931* (2020.01)
*G01S 13/58* (2006.01)

(52) U.S. Cl.
CPC ............ *G01S 7/023* (2013.01); *G01S 13/583* (2013.01); *G01S 13/588* (2013.01); *G01S 13/931* (2013.01)

(58) Field of Classification Search
CPC .... G01S 13/583; G01S 13/931; G01S 13/588; G01S 7/023; B60R 21/0134; B60W 2420/52; B60W 2550/10; B60W 30/08
See application file for complete search history.

(56) References Cited

U.S. PATENT DOCUMENTS

| | | | |
|---|---|---|---|
| 7,495,604 B2 | 2/2009 | Yamano et al. | |
| 2007/0140389 A1 | 6/2007 | Lindenmeier et al. | |
| 2008/0232242 A1 | 9/2008 | Healey et al. | |
| 2009/0135053 A1* | 5/2009 | Negoro | H04B 1/707 342/195 |
| 2009/0289831 A1* | 11/2009 | Akita | G01S 13/931 342/70 |
| 2010/0225524 A1 | 9/2010 | Szajnowski | |
| 2013/0121400 A1 | 5/2013 | Eliezer | |
| 2014/0145872 A1* | 5/2014 | Shirakawa | G01S 7/2928 342/132 |
| 2016/0025853 A1 | 1/2016 | Amano | |
| 2016/0041256 A1 | 2/2016 | Schofield, III et al. | |
| 2016/0124075 A1 | 5/2016 | Vogt et al. | |
| 2016/0223644 A1* | 8/2016 | Soga | G01S 7/023 |
| 2016/0238694 A1 | 8/2016 | Kishigami et al. | |
| 2018/0048493 A1* | 2/2018 | Bordes | G01S 13/325 |
| 2018/0088224 A1* | 3/2018 | Kishigami | H01Q 21/08 |

FOREIGN PATENT DOCUMENTS

| | | |
|---|---|---|
| JP | 2008-292264 A | 12/2008 |
| JP | 2011-38519 A | 2/2011 |
| JP | 2011-122876 A | 6/2011 |
| JP | 2016-29363 A | 3/2016 |
| JP | 2016-53552 A | 4/2016 |
| KR | 10-2016-0134980 A | 11/2016 |

* cited by examiner

*Primary Examiner* — Timothy X Pham
(74) *Attorney, Agent, or Firm* — NSIP Law

(57) ABSTRACT

Disclosed is a method and apparatus for detecting an object using a radar in a vehicle, wherein object detection is performed by generating a transmission signal using a code sequence, receiving an echo signal reflected from an object, and detecting the object based on the echo signal and the code sequence.

23 Claims, 13 Drawing Sheets

METHOD AND APPARATUS FOR DETECTING OBJECT USING RADAR OF VEHICLE

CROSS-REFERENCE TO RELATED APPLICATIONS

This application claims the benefit under 35 USC § 119(a) of Korean Patent Application No. 10-2017-0154249 filed on Nov. 17, 2017 in the Korean Intellectual Property Office, the entire disclosure of which is incorporated herein by reference for all purposes.

BACKGROUND

1. Field

The following description relates to a method and apparatus for detecting an object using a vehicle's radar.

2. Description of Related Art

Advanced driver-assistance systems (ADAS) prevent dangerous driving situations and enhance safety and convenience of drivers using sensors located inside or outside a vehicle. ADAS is an important component of autonomous vehicles. Sensors, such as, for example, a camera, an infrared ray sensor, an ultrasonic sensor, a lidar, and a radar are used for ADAS. Radar can stably measure an object in a vicinity of a vehicle regardless of a surrounding environment such as the weather, in comparison to an optical-based sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of detecting an object using a radar, including propagating a transmission signal generated based on a code sequence, receiving an echo signal, detecting an object based on a correlation between the code sequence and the echo signal, determining whether the object is detected by an interference signal based on an intensity of the echo signal and a distance from the object, and changing the code sequence in response to the object being detected by the interference signal.

The transmission signal may correspond to a phase modulated continuous waveform (PMCW).

The transmission signal may correspond to a frequency modulated continuous waveform (FMCW).

The code sequence may be determined based on any one or any combination of an autocorrelation and a cross-correlation.

The detecting of the object may include generating a digital echo signal by converting the echo signal into a digital signal.

The detecting of the object may include generating cumulative signals by accumulating digital echo signals for each chip period of the code sequence, and detecting the object based on a correlation between the code sequence and each of the cumulative signals.

The detecting of the object based on the correlation may include calculating the correlation between the code sequence and each of the cumulative signals, and detecting the object by detecting an effective signal from the cumulative signals based on the calculated correlation.

The detecting of the effective signal may include detecting the effective signal corresponding to a correlation greater than or equal to a threshold.

The detecting of the object may include calculating the distance from the object based on a delay time of the effective signal.

The calculating of the object further may include calculating a speed of the object based on the distance from the object.

The determining of whether the object is detected by the interference signal may include determining the intensity of the echo signal, and determining that the object is detected by the interference signal, in response to the intensity of the interference signal being greater than a threshold set based on the distance from the object.

The changing of the code sequence may include generating a random number, and determining a target code sequence from candidate code sequences based on the random number.

The receiving of the echo signal may include receiving the echo signal after a period of time has elapsed from a time of the propagating of the transmission signal.

In one general aspect, there is provided an apparatus for detecting an object using a radar, the apparatus including a processor configured to propagate a transmission signal generated based on a code sequence, receive an echo signal, detect an object based on a correlation between the code sequence and the echo signal, determine whether the object is detected by an interference signal based on an intensity of the echo signal and a distance from the object, and change the code sequence in response to the object being detected by the interference signal.

The transmission signal may correspond to a phase modulated continuous waveform (PMCW).

The code sequence may be determined based on any one or any combination of an autocorrelation and a cross-correlation.

The processor may be configured to generate a digital echo signal by converting the echo signal into a digital signal.

The processor may be configured to generate cumulative signals by accumulating digital echo signals for each chip period of the code sequence, and detect the object based on a correlation between the code sequence and each of the cumulative signals.

The processor may be configured to calculate the correlation between the code sequence and each of the cumulative signals, and detect the object by detecting an effective signal from the cumulative signals based on the calculated correlation.

The processor may be configured to calculate the distance from the object based on a delay time of the effective signal.

The processor may be configured to determine the intensity of the echo signal, and determine that the object is detected by the interference signal, in response to the intensity of the interference signal being greater than a threshold set based on the distance from the object.

The processor may be configured to generate a random number, and determine a target code sequence from candidate code sequences based on the random number.

The apparatus may include a memory configured to store a program executed by the processor.

In one general aspect, there is provided a method of detecting an object using a radar, including propagating a transmission signal generated based on a code sequence, determining an intensity of an echo signal, received at a receiver of the radar, detecting an object based on a correlation between the code sequence and the echo signal, determining that the object is detected by an interference signal, in response to an intensity of the echo signal being greater than a threshold based on a distance of the object from the receiver, and changing the code sequence in response to the object being detected by the interference signal.

Other features and aspects will be apparent from the following detailed description, the drawings, and the claims.

Figure 1:
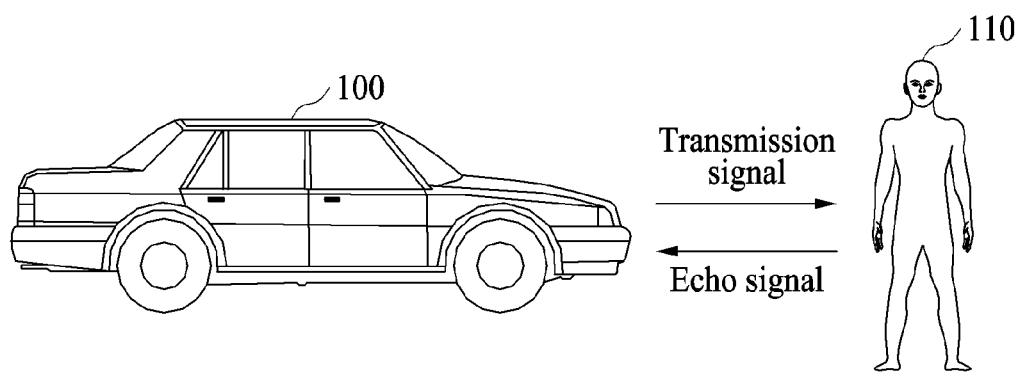
FIG. 1 illustrates an example of a method of detecting an object around a vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of a method of detecting an object around a vehicle.

In an example, an object 110 around a vehicle 100 is detected by transmitting a signal to a periphery of the vehicle 100 and detecting the signal reflected from the object 110. For example, a radar of the vehicle 100 transmits a signal for object detection to the periphery of the vehicle 100 and calculates a time of flight (ToF) using the signal reflected from the object 110, thereby calculating a distance between the vehicle 100 and the object 110.

In an example, the radar transmits a modulated signal to the periphery of the vehicle 100 to distinguish between the signal reflected from the object 110 and other signals such as noise. In an example, the modulated signal is a frequency modulated continuous waveform (FMCW) signal. The FMCW signal is, for example, a signal having a frequency modulated based on 77 gigahertz (GHz). A high resolution may be achieved using a millimeter wave in a 77 GHz band. In another example, the modulated signal is a phase modulated continues waveform (PMCW) signal. The PMCW signal is, for example, a signal having a phase modulated based on 77 GHz. A code sequence is used to generate the PMCW signal. The code sequence includes consecutive signals of a plurality of codes, for example, a binary code representing 0 or 1.

Figure 2:
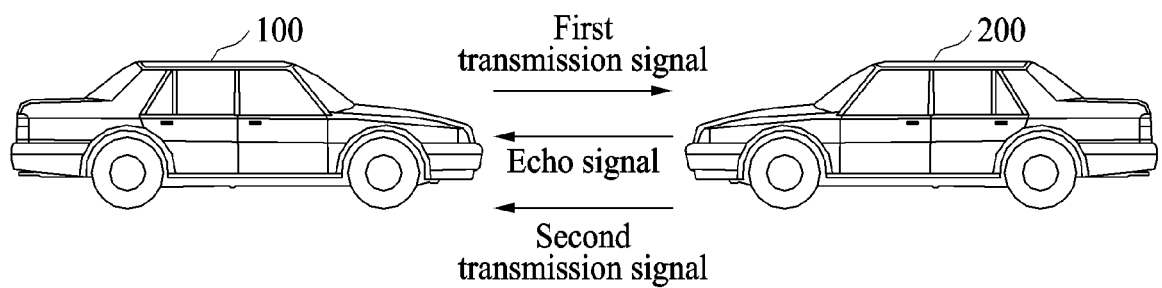
FIG. 2 illustrates an example of an interference signal of another vehicle.

FIG. 2 illustrates an example of an interference signal of another vehicle.

In an example, a code sequence is determined based on an autocorrelation characteristic and a cross-correlation characteristic. The determined code sequence has a small correlation value with respect to a non-zero delay and has a great correlation value with respect to a zero delay. Also, the determined code sequence has a small correlation value with respect to another code sequence.

For example, when the code sequence includes 256 chips, a number of code sequences satisfying both the autocorrelation characteristic and the cross-correlation characteristic is limited. Since the limited number of code sequences are used to generate the PMCW signal, the same code sequence may be used by a plurality of vehicles when numerous vehicles generate the PMCW signal.

The vehicle 100 and a vehicle 200 use the same code sequence to detect objects. When the vehicle 100 and the vehicle 200 use the same code sequence, a first transmitting signal propagated by the vehicle 100 may be the same as a second transmitting signal propagated by the vehicle 200.

The vehicle 100 receives an echo signal corresponding to the reflected first transmitting signal and the second transmitting signal propagated by the vehicle 200. Since the echo signal is reflected from the object, the vehicle 100 may calculate a distance from the object using the echo signal. However, since the second transmitting signal is a signal that is directly propagated from the vehicle 200, information on the object detected by the vehicle 100 may be erroneous. When such incorrect information on the object is acquired, the vehicle 100 is interfered with driving.

When the vehicle 200 using the same code sequence as the vehicle 100 is present around the vehicle 100, the code sequence used in the vehicle 100 is changed to avoid a situation in which the vehicle 100 and the vehicle 200 use the same code sequence. A method of detecting an object by changing a code sequence will be further described with reference to FIGS. 3 through 13.

Figure 3:
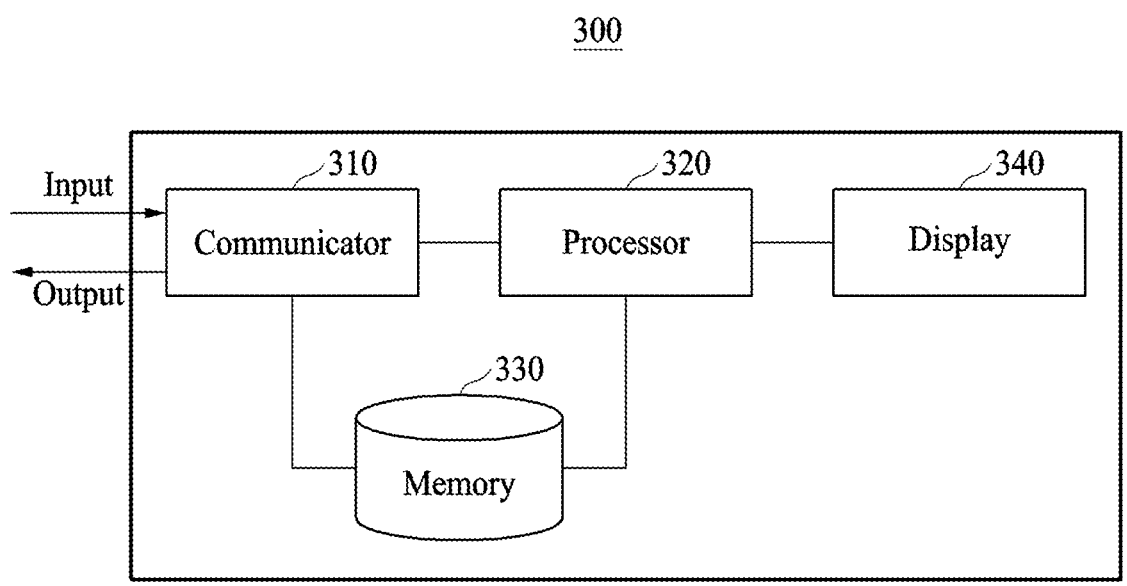
FIG. 3 illustrates an example of an object detection apparatus.

FIG. 3 illustrates an example of an object detection apparatus.

An object detection apparatus 300 includes a communicator 310, a processor 320, a memory 330, and a display 340. The object detection apparatus 300 may be included in the vehicle 100 as described with reference to FIGS. 1 and 2.

The object detection apparatus 300 is, for example, an electronic control unit (ECU) of the vehicle 100. Also, the object detection apparatus 300 may be connected to an ECU of the vehicle 100. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device. Also, object detection apparatus 300 may be used to provide information for autonomous driving of an intelligent vehicle by recognizing an object and controlling an autonomous vehicle. In an example, the object detection apparatus 300 is applicable to a robot requiring a positioning operation.

The communicator 310 is connected to the processor 320 and the memory 330 to perform data transmission and reception. The communicator 310 is connected to an external device to perform data transmission and reception.

The communicator 310 is implemented as, for example, a circuitry in the object detection apparatus 300. In an example, the communicator 310 includes an internal bus and an external bus. In another example, the communicator 310 is an element configured to connect the object detection apparatus 300 to an external device. The communicator 310 is, for example, an interface. The communicator 310 receives data from the external device and transmits data to the processor 320 and the memory 330.

The processor 320 processes data received by the communicator 310 and data stored in the memory 330. The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The processor 320 executes a computer-readable code (for example, software) stored in a memory (for example, the memory 330), and executes instructions caused by the processor 320.

The memory 330 stores data received by the communicator 310 and data processed by the processor 320. For example, the memory 330 stores a program. The stored program is a set of syntaxes coded for detecting an object in order to be executed by the processor 320.

The memory 330 includes, for example, at least one volatile memory, a nonvolatile memory, a random access memory (RAM), a flash memory, a hard disk drive and an optical disc drive.

The memory 330 stores an instruction set (for example, software) to operate the object detection apparatus 300. The instruction set for operating the object detection apparatus 300 is executed by the processor 320.

In an example, the object detected by the object detection apparatus 300 is output to a display 340. In an example, the object detection apparatus 300 displays the object on a windshield glass of the vehicle through a head-up display (HUD). However, the displaying of the position is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the object detection apparatus 300 may be used without departing from the spirit and scope of the illustrative examples described.

The communicator 310, the processor 320, and the memory 330 will be further described below with reference to FIGS. 4 through 15, and the description below.

Figure 4:
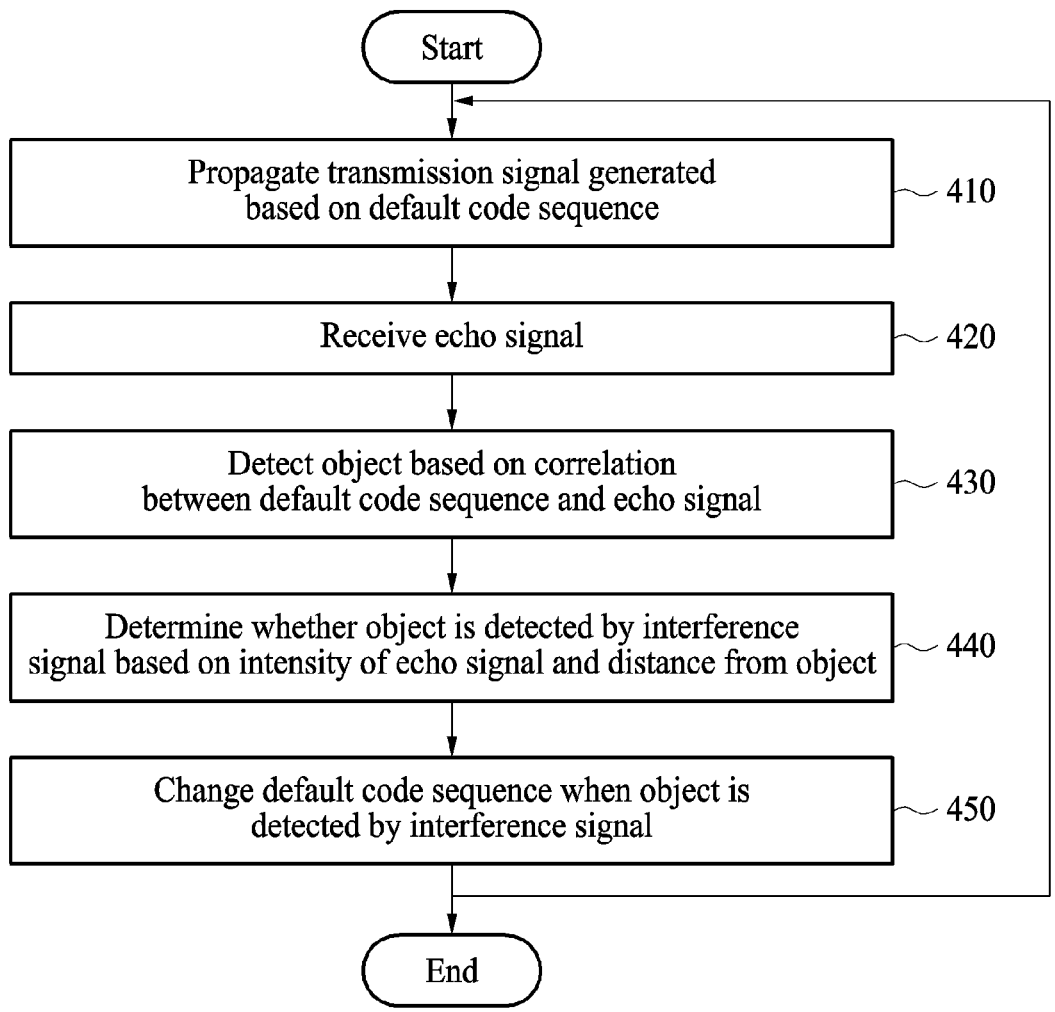
FIG. 4 illustrates an example of an object detection method.

FIG. 4 illustrates an example of an object detection method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In an example, operations 410 through 450 are performed by the object detection apparatus 300 of FIG. 3.

In operation 410, the communicator 310 propagates a transmission signal generated based on a default code sequence to a periphery of the vehicle 100. The communicator 310 propagates the transmission signal using, for example, a transmitter of a radar.

In an example, the default code sequence includes a plurality of codes and is determined based on at least one of an autocorrelation and a cross-correlation. The default code sequence is, for example, a digital signal.

In an example, the processor 320 converts the default code sequence into a transmission signal using a digital-to-analog converter (DAC). The transmission signal is, for example, a PMCW. The default code sequence and the transmission signal will be further described with reference to FIG. 5.

In operation 420, the communicator 310 receives an echo signal. When an object is located in a detectable range of the radar, the transmission signal is reflected by the object, and the communicator 310 receives the echo signal using a receiver of the radar.

In operation 430, the processor 320 detects an object based on the default code sequence and the echo signal. The processor 320 obtains a correlation between the default code sequence and a digital echo signal generated based on the received echo signal and detects the object based on the obtained correlation. A method of detecting an object will be further described with reference to FIGS. 8 through 12.

In operation 440, the processor 320 determines whether the object is detected by an interference signal based on an intensity of the echo signal and a distance from the object. Determination of whether the object is detected by the interference signal will be further described with reference to FIGS. 11 and 12.

In operation 450, when the object is detected by the interference signal, the processor 320 changes the default code sequence. The changed default code sequence is used to detect the object. A method of changing the default code sequence will be further described with reference to FIG. 13.

Figure 5:
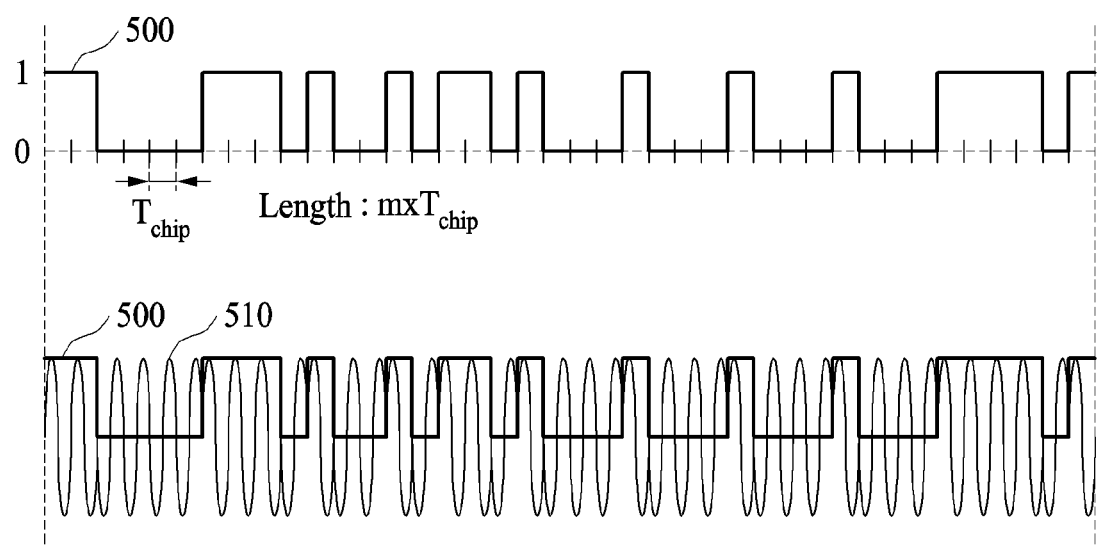
FIG. 5 illustrates an example of a default code sequence and a transmission signal.

FIG. 5 illustrates an example of a default code sequence and a transmission signal.

A default code sequence 500 is generated based on at least two codes. The at least two codes include, for example, a code representing 0 and a code representing 1 or a code representing a low value and a code representing a high value.

A single code is represented during a single chip period $T_{chip}$. The default code sequence 500 includes m codes. A length of the default code sequence 500 is obtained using "$m \times T_{chip}$", m being, for example, 256.

In an example, the default code sequence 500 is determined based on an autocorrelation and a cross-correlation. In an example, the default code sequence 500 has a small correlation value with respect to a non-zero delay and has a great correlation value with respect to a zero delay. Also, the default code sequence 500 has a small correlation value with respect to another code sequence.

The object detection apparatus 300 generates a transmission signal 510 based on the default code sequence 500. In an example, the object detection apparatus 300 generates the transmission signal 510 using a continuous waveform corresponding to each code. The code representing 0 and the code representing a low value correspond to sine waves. The generated transmitting signal 510 is a PMCW.

Figure 6:
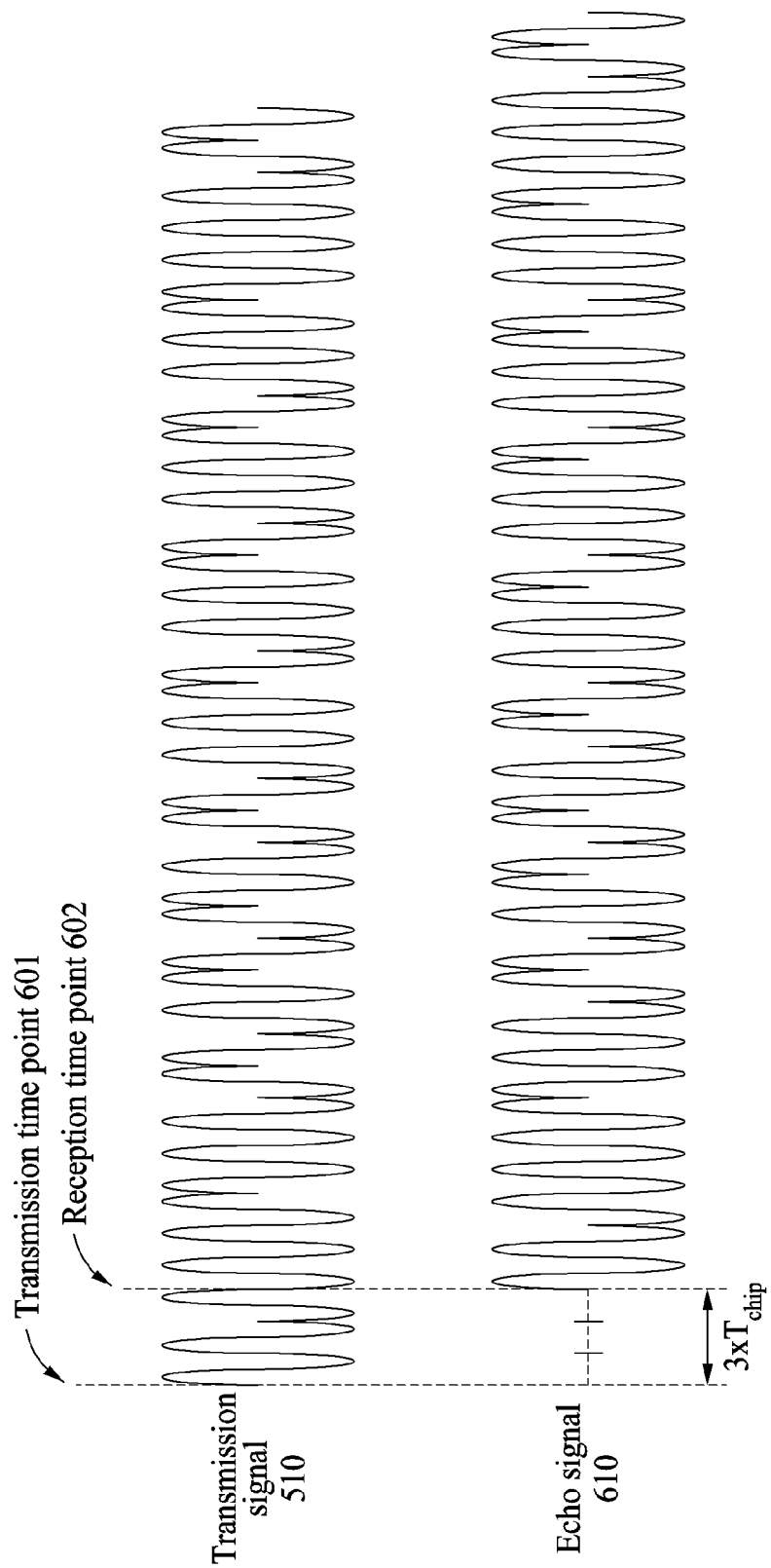
FIG. 6 illustrates an example of a transmission signal and a reflected signal.

FIG. 6 illustrates an example of a transmission signal and a reflected signal.

When an object is present around a radar, an echo signal 610 is received after a period of time elapses from a point in time at which the transmission signal 510 is transmitted or propagated. In the example of FIG. 6, reception of the echo signal 610 starts after a time of "$3 \times T_{chip}$" elapses.

When the radar starts receiving the echo signal 610 using a receiver, the processor 320 is unaware of whether a received signal is the echo signal 610 corresponding to the transmission signal. The processor 320 accumulates the received signal based on a length of the transmission signal 510 to determine whether the received signal is the echo signal 610 and determines whether a cumulative signal corresponds to the transmission signal 510. When the cumulative signal corresponds to the transmission signal 510, it is determined that the cumulative signal is the echo signal 610.

When the transmission signal 510 is repetitively transmitted, the echo signal 610 is also received repetitively. FIG. 6 illustrates a signal is not received in the earlier time of "$3 \times T_{chip}$" of the echo signal 610. However, embodiments are not limited thereto. For example, when the transmission signal 510 is repetitively transmitted, a signal corresponding to a last time of "$3 \times T_{chip}$" of the transmission signal 510 transmitted in a previous period may be received in a subsequent period.

Figure 7:
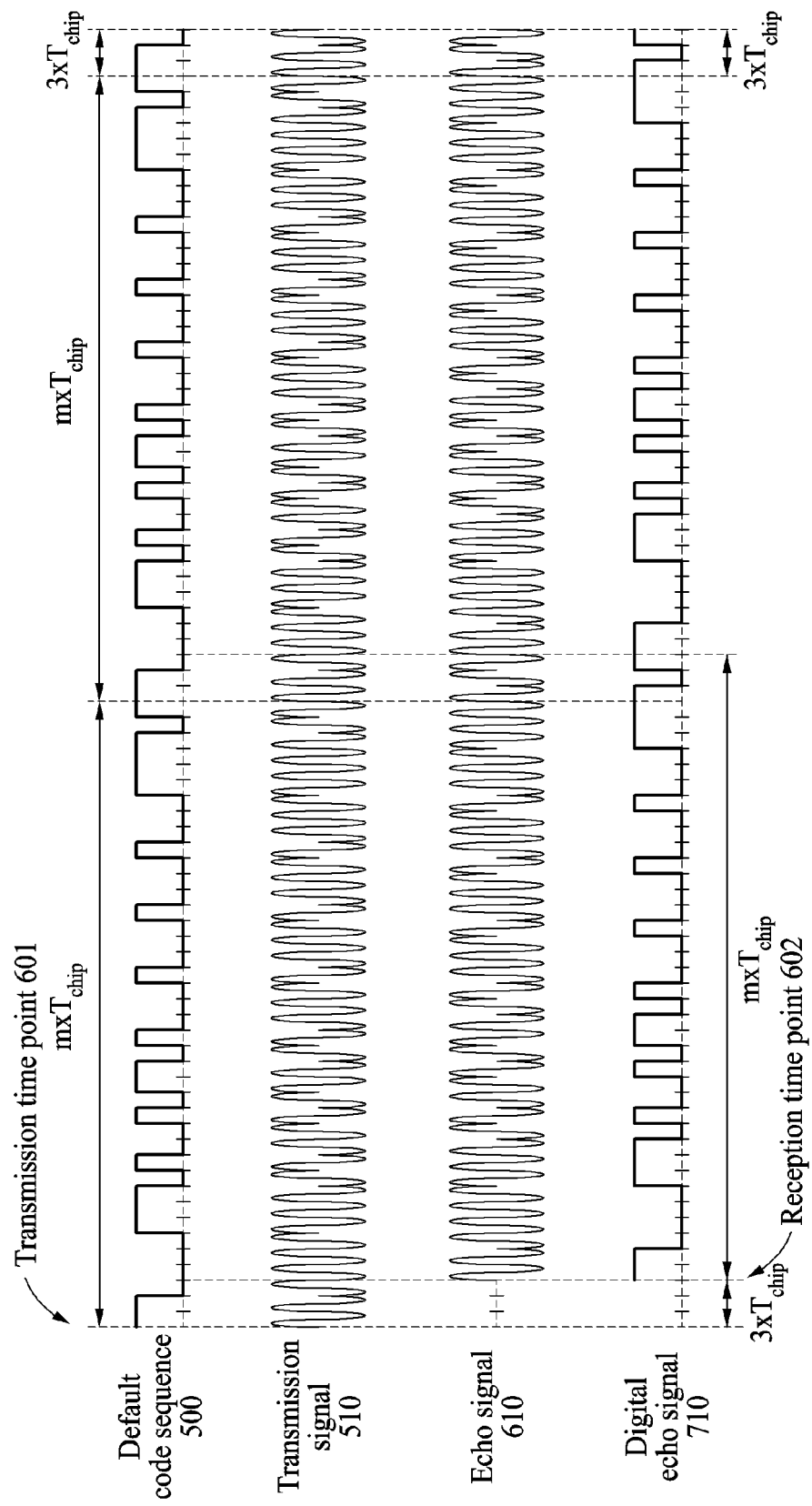
FIG. 7 illustrates an example of a default code sequence, a transmission signal, a reflected signal, and a digital reflected signal.

FIG. 7 illustrates an example of a default code sequence, a transmission signal, a reflected signal, and a digital reflected signal.

The default code sequence 500 includes m codes. The transmission signal 510 is a PMCW signal corresponding to the default code sequence 500.

The time at which reception of the echo signal 610 starts varies based on a distance from an object. Reception of the echo signal 610 associated with an object located adjacent to a radar starts immediately after a point in time 601 at which the transmission signal 510 is transmitted. In the following description, an expression "a point in time at which "A" is transmitted" is also referred to as "a transmission time point of "A"", and similarly, an expression "a point in time at which "A" is received" is also referred to as "a reception time point of "A"". Reception of the echo signal 610 located within a maximum detection distance of the radar starts after a time of "$m \times T_{chip}$" elapses after a transmission time point of a transmission signal 510. A maximum detection distance of the radar is obtained using, for example, "$(m \times T_{chip} \times c)/2$", c being a velocity of light.

In an example, the echo signal 610 starts at a reception point in time 602 where a time of "$3 \times T_{chip}$" has elapsed from the transmission time point 601 of the transmission signal 510. The processor 320 generates a digital echo signal 710 by converting a signal received for each chip period into a corresponding code. Since the echo signal 610 is not received during the time of "$3 \times T_{chip}$" from the transmission time point 601 of the transmission signal 510, a code of the digital echo signal 710 is not generated.

Although the digital echo signal 710 is continuously generated for each chip period, whether the digital echo signal 710 actually corresponds to the transmission signal 510 and an amount of time delayed from the transmission time point 601 of the transmission signal 510 until the digital echo signal 710 is received may not be verified based on only the digital echo signal 710. The reception point in time 602 of the echo signal 610 is not calculated based on the digital echo signal 710. A method of calculating the point in time 602 at which the echo signal 610 is received using a plurality of cumulative signals will be further described with reference to FIGS. 8 and 9.

Figure 8:
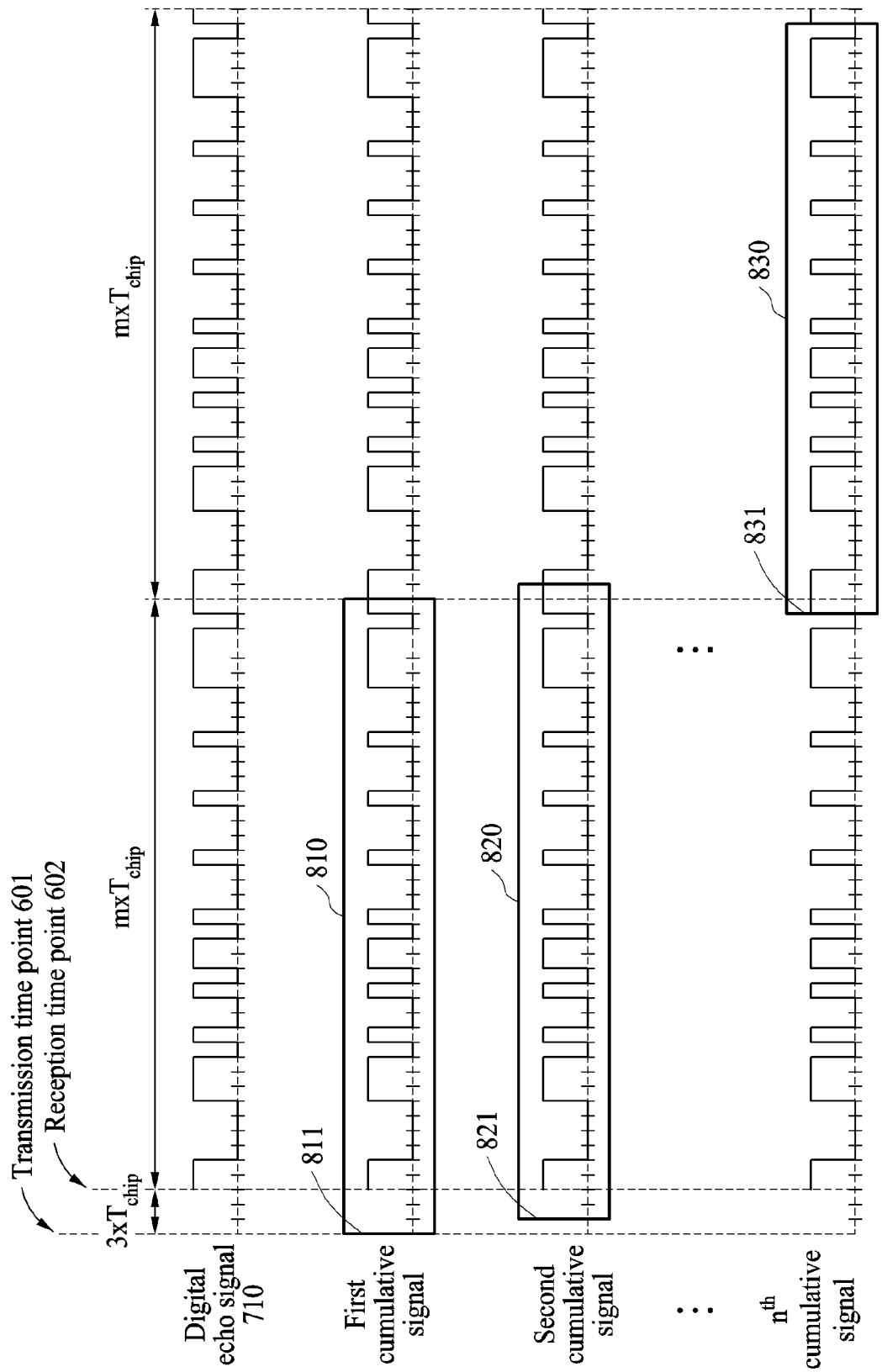
FIG. 8 illustrates an example of a method of generating a cumulative signal for each chip period.

FIG. 8 illustrates an example of a method of generating a cumulative signal for each chip period.

The processor 320 converts the echo signal 610 into a digital signal and accumulates the digital signal for each chip period, thereby generating the digital echo signal 710. Although FIG. 8 illustrates the digital echo signal 710 corresponding to an overall period, the digital echo signal 710 is continuously generated over time. Also, it is understood that a portion of the digital echo signal 710 for a single chip period is generated continuously. In the example of FIG. 8, the digital echo signal 710 of a leftmost portion is generated first, and then the digital echo signal 710 of a remaining rightward portion is generated thereafter.

In an example, the processor 320 generates a plurality of cumulative signals, for example, a first cumulative signal 810, a second cumulative signal 820, and an $m^{th}$ cumulative signal 830 by accumulating portions of the digital echo signal 710 for each chip period using a plurality of accumulators. Each of the cumulative signals includes m codes.

In another example, the processor 320 includes a code generated for a current chip period as a last code and generates a cumulative signal including a total of m codes for each chip period. In this example, the m codes are stored in a queue. The stored codes are changed based on a first-in first-out (FIFO) method. Each of the plurality of cumulative signals is cumulative data of the queue corresponding to the chip period in which the last code of the queue for each of the cumulative signals is generated.

A first cumulative signal 810 is a signal obtained through accumulation performed during a time of "$m \times T_{chip}$" from a first point in time 811. A second cumulative signal 820 is a signal obtained through accumulation performed during the time of "$m \times T_{chip}$" from a second point in time 821. An $m^{th}$ cumulative signal 830 is a signal obtained through accumulation performed during the time of "$m \times T_{chip}$" from an $m^{th}$ point in time 831.

The first point in time 811 through the $m^{th}$ point in time 831 are calculated using a system clock. For example, the transmission time point 601 of the transmission signal 510 is synchronized with the system clock. Also, a start time point of each accumulator is calculated based on a difference from the system clock.

Figure 9:
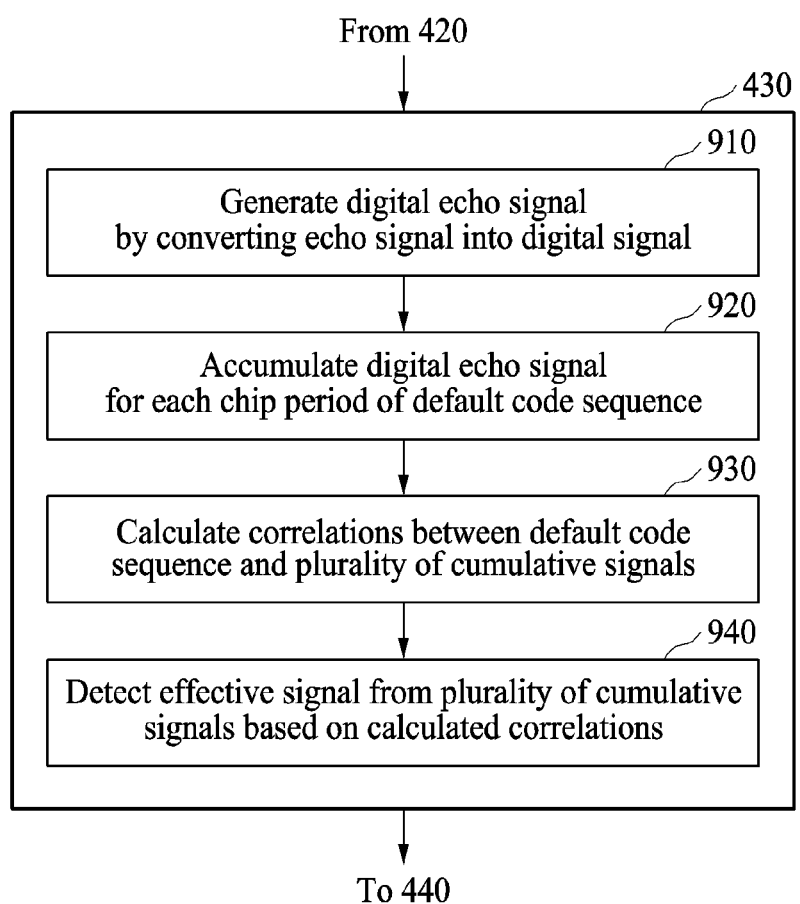
FIG. 9 illustrates an example of a method of detecting an object based on a plurality of cumulative signals.

FIG. 9 illustrates an example of a method of detecting an object based on a plurality of cumulative signals. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Operations 910, 920, 930, and 940 are included in operation 430 of FIG. 4.

In operation 910, the processor 320 generates the digital echo signal 710 by converting the echo signal 610 into a digital signal. In an example, the processor 320 generates the digital echo signal 710 corresponding to a chip period based on a waveform of the echo signal 610 received during the chip period.

In operation 920, the processor 320 accumulates the digital echo signal 710 for each chip period of the default code sequence 500. The processor 320 generates a plurality of cumulative signals, for example, the first cumulative signal 810, the second cumulative signal 820, and the $m^{th}$ cumulative signal 830 by accumulating the digital echo signal 710 for each chip period using a plurality of accumulators. A first accumulator generates the first cumulative signal 810 by accumulating codes during a time of "$m \times T_{chip}$" from the first point in time 811. A second accumulator generates the second cumulative signal 820 by accumulating codes during the time of "$m \times T_{chip}$" from the second point in time 821. An $m^{th}$ accumulator generates the $m^{th}$ cumulative signal 810 by accumulating codes during the time of "$m \times T_{chip}$" from the $m^{th}$ point in time 831. A total of m cumulative signals are generated for a single transmission period of the transmission signal 510.

In operation 930, the processor 320 calculates correlations between the default code sequence 500 and the plurality of cumulative signals. In an example, the processor 320 calculates a correlation between the first cumulative signal 810 and the default code sequence 500, a correlation between the second cumulative signal 820 and the default code sequence 500, and a correlation between the $m^{th}$ cumulative signal 830 and the default code sequence 500.

In operation 940, the processor 320 detects an effective signal from the plurality of cumulative signals based on the calculated correlations. The processor 320 detects a signal corresponding to a correlation greater than or equal to a threshold among the correlations calculated for the plurality of cumulative signals as the effective signal. In an example, when the effective signal is not detected, it is determined that an object is absent around the vehicle 100.

For example, the processor 320 acquires range-Doppler data by performing a fast Fourier transform (FFT) operation on a signal correlated between the default code sequence 500 and the plurality of cumulative signals. A position having a maximum correlation value with the cumulative signals is determined based on the range-Doppler data, and a cumulative signal with the position is detected as an effective signal.

In the examples described with reference to FIGS. 1 through 8, a cumulative signal of which accumulation starts after a time of "$3 \times T_{chip}$" elapses from the transmission time point 601 of the transmission signal 510 is detected as the effective signal.

Operations following operation 940 included in operation 430 will be described below with reference to FIG. 10.

Figure 10:
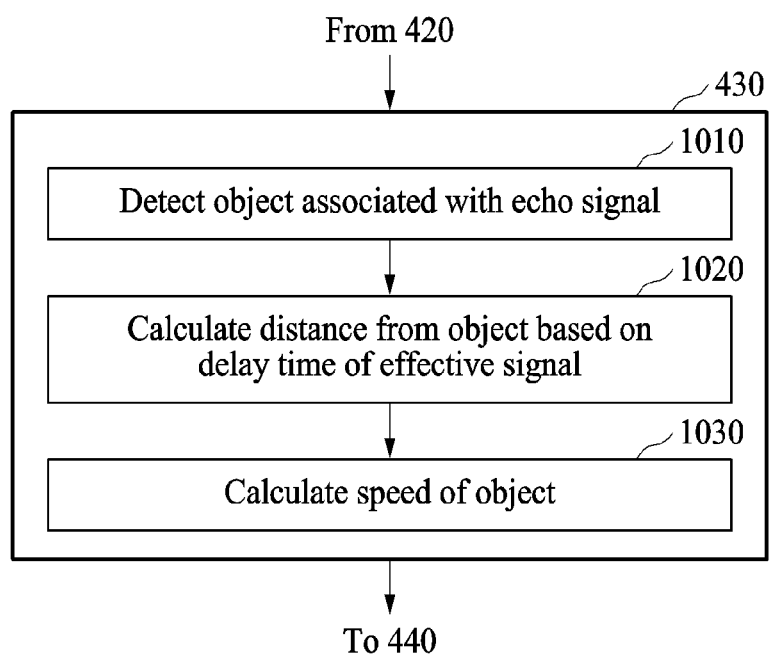
FIG. 10 illustrates an example of a method of calculating a distance from an object and a speed of the object.

FIG. 10 illustrates an example of a method of calculating a distance from an object and a speed of the object. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

Operations 1010, 1020, and 1330 are included in operation 430 of FIG. 4. For example, operation 1010 is performed after operation 940 of FIG. 9.

In operation 1010, the processor 320 detects an object associated with the echo signal 610. When an effective signal is detected from a plurality of cumulative signals 810, 820, and 830, the processor 320 detects an object associated with the effective signal. The effective signal is a signal corresponds to a default code sequence.

In operation 1020, the processor 320 calculates a distance from the object based on a delay time of the effective signal. The processor 320 calculates the distance from the object using Equation 1. In Equation 1, c denotes a velocity of light and $t_{delay}$ denotes a delay time of an effective signal. The delay time indicates an amount of time by which the effective signal is delayed from the transmission time point 601 of the transmission signal 510 to be received.

$$\text{Distance} = \frac{c \times t_{delay}}{2} \qquad \text{[Equation 1]}$$

For a single period of the transmission signal 510, the object is detected four times and distances from the detected object are calculated. When the transmission signal 510 is repetitively transmitted, the object is detected repetitively.

In operation 1030, the processor 320 calculates a speed of the object based on the distances calculated in association with the transmission signals 510.

Figure 11:
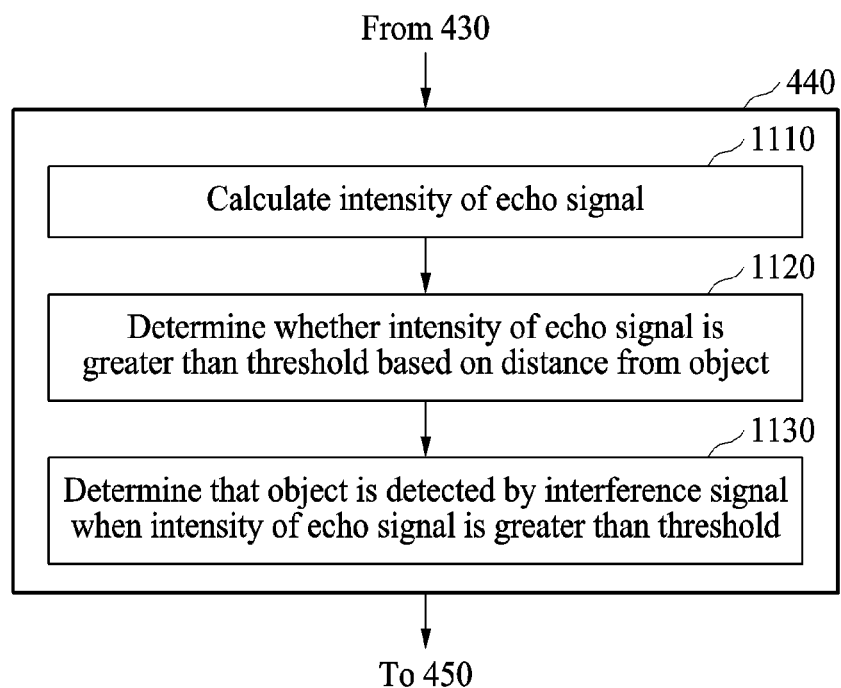
FIG. 11 illustrates an example of a method of determining whether an object is detected by an interference signal.

FIG. 11 illustrates an example of a method of determining whether an object is detected by an interference signal. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

Operations 1110, 1120, and 1130 are included in operation 440.

In operation 1110, the processor 320 calculates an intensity of the echo signal 610. The processor 320 calculates an intensity of a signal that is determined to be an effective signal among cumulative signals, for example, the first cumulative signal 810, the second cumulative signal 820, and the $m^{th}$ cumulative signal 830.

In operation 1120, the processor 320 determines whether an intensity of the echo signal 610 is greater than a threshold set based on a distance from an object. For example, whether the intensity of the effective signal is greater than the threshold set for the effective signal based on the distance from the object is determined. The threshold of the intensity of signal set based on the distance from the object will be described with reference to FIG. 12.

In operation 1130, the processor 320 determines that the object is detected by an interference signal, when the intensity of the echo signal 610 is greater than the threshold. The echo signal 610 is determined to be a transmission signal propagated by another vehicle, for example, the vehicle 200 instead of an echo signal based on the transmission signal 510. When the object is detected by the interference signal, it is determined that the object is a false object.

Figure 12:
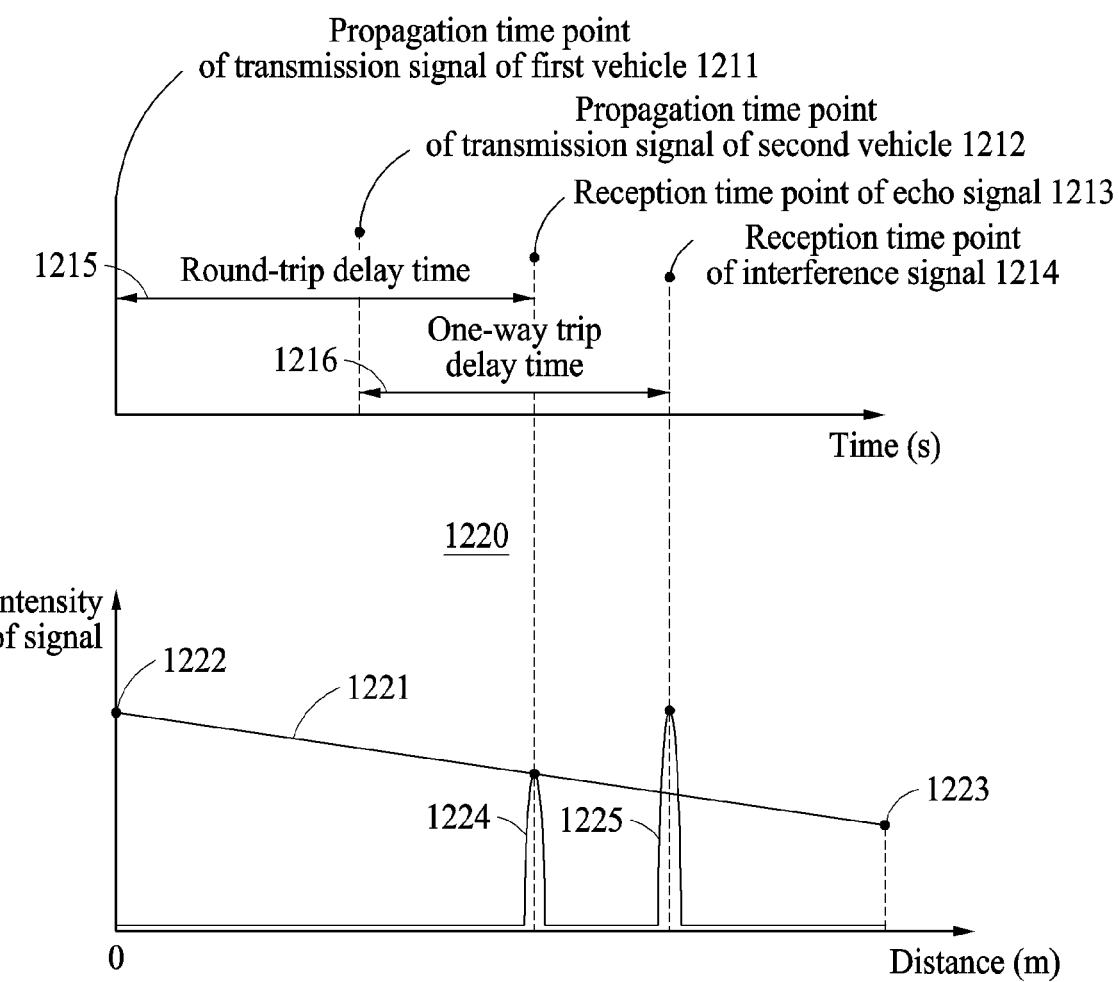
FIG. 12 illustrates an example of a threshold intensity of a signal set based on a distance from a detected object and intensities of signals associated with the detected object.

FIG. 12 illustrates an example of a threshold intensity of a signal set based on a distance from a detected object and intensities of signals associated with the detected object.

A time line 1210 indicates an object detection time corresponding to propagation performed on the transmission signal 510 once. The object detection time may be a time of "$2 \times m \times T_{chip}$" from a propagation time point 1211 of the transmission signal 510. An earlier time of "$m \times T_{chip}$" overlaps a previous object detection time of the transmission signal 510 and a later time of "$m \times T_{chip}$" overlaps a subsequent object detection time of the transmission signal 510.

A transmission signal in which propagation has started at the propagation time point 1211 of the vehicle 100 is reflected from an object, and then reception of the reflected transmission signal, for example, an echo signal starts at a reception time point 1213. A first distance from a first object is calculated based on a round-trip delay time 1215.

When the vehicle 100 and the vehicle 200 use the same default code sequence, a transmission signal propagated from the vehicle 200 is received in the vehicle 100. When the vehicle 200 propagates the transmission signal at a propagation time point 1212, the propagated transmission signal is received by the vehicle 100 at a reception time point 1214 of an interference signal. The object detection apparatus 300 of the vehicle 100 determines the interference signal to be the echo signal and detects a second object associated with the interference signal. Although an actual distance between the vehicle 100 and the vehicle 200 corresponds to a one-way trip delay time 1216, the object detection apparatus 300 calculates a second distance from the second object based on a time difference between the propagation time point 1211 and the reception time point 1214. Thus, the second distance may be calculated to be greater than the actual distance.

The second object is not an object associated with the transmission signal 510 propagated from the vehicle 100, and thus, is to be excluded from detected objects. In an example, an intensity of a received signal is considered to verify that the second object is a false object.

In general, an intensity of signal may decrease as a flight distance increases. Based on such characteristic, a threshold 1221 of an intensity of a signal is set based on a distance from a detected object. For example, a trajectory of the threshold 1221 based on the distance is set such that a threshold 1222 corresponding to a distance of zero meters is the greatest and a threshold 1223 corresponding to a maximum distance from a detectable object is the smallest.

An intensity 1224 of the echo signal associated with the first object is less than or equal to the threshold 1221. When the intensity 1224 of the echo signal associated with the first object is less than or equal to the threshold 1221, it is determined that the first object is an actual object.

An intensity 1225 of the echo signal associated with the second object is greater than the threshold 1221. When the intensity 1225 of the echo signal associated with the second object is greater than the threshold 1221, it is determined that the second object is a false object.

When the false object is detected, the vehicle 200 using the same default code sequence as the vehicle 100 is present and thus, the default code sequence used by the vehicle 100 is changed.

Figure 13:
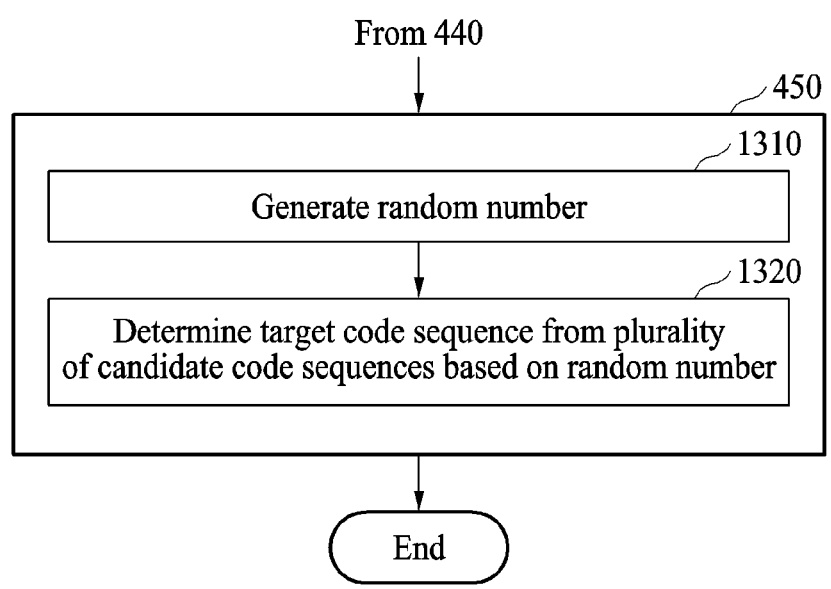
FIG. 13 illustrates an example of a method of changing a default code sequence.

FIG. 13 illustrates an example of a method of changing a default code sequence. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Operations 1310 and 1320 are included in operation 450 of FIG. 4.

In operation 1310, the processor 320 generates a random number.

In operation 1320, the processor 320 determines a target code sequence from a plurality of candidate code sequences based on the random number. In an example, the plurality of candidate code sequences is determined based on at least one of an autocorrelation and a cross-correlation. A code sequence of a used default code sequence is excluded from the plurality of candidate code sequences.

The object detection apparatus 300 performs operations 410 through 440 again using a changed default sequence code.

The object detection apparatus 300 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 9-11, and 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting an object using a radar, comprising:
   propagating a transmission signal generated based on a code sequence;
   receiving an echo signal;
   detecting an object based on a correlation between the code sequence and the echo signal;
   determining whether the object is detected by an interference signal based on an intensity of the echo signal and a distance from the object, wherein the determining of whether the object is detected by the interference signal comprises:
   determining the intensity of the echo signal; and
   determining that the object is detected by the interference signal, in response to the intensity of the echo signal being greater than a threshold set based on the distance from the object; and
   changing the code sequence in response to the object being detected by the interference signal.

2. The method of claim 1, wherein the transmission signal corresponds to a phase modulated continuous waveform (PMCW).

3. The method of claim 1, wherein the transmission signal corresponds to a frequency modulated continuous waveform (FMCW).

4. The method of claim 2, wherein the code sequence is determined based on any one or any combination of an autocorrelation and a cross-correlation.

5. The method of claim 1, wherein the detecting of the object comprises:
   generating a digital echo signal by converting the echo signal into a digital signal.

6. The method of claim 5, wherein the detecting of the object comprises:
   generating cumulative signals by accumulating digital echo signals for each chip period of the code sequence; and
   detecting the object based on a respective correlation between the code sequence and each of the cumulative signals.

7. The method of claim 6, wherein the detecting of the object based on the correlation comprises:
   calculating the respective correlation between the code sequence and each of the cumulative signals; and
   detecting the object by detecting an effective signal from the cumulative signals based on the calculated respective correlation.

8. The method of claim 7, wherein the detecting of the effective signal comprises detecting the effective signal corresponding to a correlation greater than or equal to a threshold.

9. The method of claim 7, wherein the detecting of the object further comprises:
   calculating the distance from the object based on a delay time of the effective signal.

10. The method of claim 7, wherein the calculating of the object further comprises:
    calculating a speed of the object based on the distance from the object.

11. The method of claim 1, wherein the changing of the code sequence comprises:
    generating a random number; and
    determining a target code sequence from candidate code sequences based on the random number.

12. The method of claim 1, wherein the receiving of the echo signal comprises receiving the echo signal after a period of time has elapsed from a time of the propagating of the transmission signal.

13. A non-transitory computer-readable storage medium storing instructions that, when executed by a processor, cause the processor to perform the method of claim 1.

14. An apparatus for detecting an object using a radar, the apparatus comprising:
    a processor configured to:
    propagate a transmission signal generated based on a code sequence;
    receive an echo signal;
    detect an object based on a correlation between the code sequence and the echo signal;
    determine whether the object is detected by an interference signal based on an intensity of the echo signal and a distance from the object, wherein the processor is further configured to:
    determine the intensity of the echo signal; and
    determine that the object is detected by the interference signal, in response to the intensity of the echo signal being greater than a threshold set based on the distance from the object; and
    change the code sequence in response to the object being detected by the interference signal.

15. The apparatus of claim 14, wherein the transmission signal corresponds to a phase modulated continuous waveform (PMCW).

16. The apparatus of claim 15, wherein the code sequence is determined based on any one or any combination of an autocorrelation and a cross-correlation.

17. The apparatus of claim 14, wherein the processor is further configured to:
    generate a digital echo signal by converting the echo signal into a digital signal.

18. The apparatus of claim 17, wherein the processor is further configured to:
    generate cumulative signals by accumulating digital echo signals for each chip period of the code sequence; and
    detect the object based on a respective correlation between the code sequence and each of the cumulative signals.

19. The apparatus of claim 18, wherein the processor is further configured to:
    calculate the respective correlation between the code sequence and each of the cumulative signals; and
    detect the object by detecting an effective signal from the cumulative signals based on the calculated respective correlation.

20. The apparatus of claim 19, wherein the processor is further configured to:

calculate the distance from the object based on a delay time of the effective signal.

21. The apparatus of claim 14, wherein the processor is further configured to:

generate a random number; and determine a target code sequence from candidate code sequences based on the random number.

22. The apparatus of claim 14, further comprising a memory configured to store a program executed by the processor.

23. A method of detecting an object using a radar, comprising:

propagating a transmission signal generated based on a code sequence;

determining an intensity of an echo signal, received at a receiver of the radar;

detecting an object based on a correlation between the code sequence and the echo signal;

determining that the object is detected by an interference signal, in response to an intensity of the echo signal being determined to be greater than a threshold based on a distance of the object from the receiver; and changing the code sequence in response to the object being detected by the interference signal.

\* \* \* \* \*